United States Patent
Coskun et al.

(10) Patent No.: US 10,792,760 B2
(45) Date of Patent: Oct. 6, 2020

(54) ADDITIVE LASER MACHINING SYSTEMS AND METHODS

(71) Applicant: IPG Photonics Corporation, Oxford, MA (US)

(72) Inventors: Mustafa Coskun, Brookline, MA (US); Felix Stukalin, Southborough, MA (US); Jonathan S. Ehrmann, Sudbury, MA (US)

(73) Assignee: IPG Photonics Corporation, Oxford, MA (US)

( * ) Notice: Subject to any disclaimer, the term of this patent is extended or adjusted under 35 U.S.C. 154(b) by 322 days.

(21) Appl. No.: 15/863,403

(22) Filed: Jan. 5, 2018

(65) Prior Publication Data

US 2018/0185960 A1    Jul. 5, 2018

Related U.S. Application Data

(60) Provisional application No. 62/442,692, filed on Jan. 5, 2017.

(51) Int. Cl.
| | | |
|---|---|---|
| *B23K 26/064* | (2014.01) | |
| *B23K 26/34* | (2014.01) | |
| *B33Y 30/00* | (2015.01) | |
| *B33Y 10/00* | (2015.01) | |
| *B23K 26/06* | (2014.01) | |

(52) U.S. Cl.
CPC ........ *B23K 26/064* (2015.10); *B23K 26/0608* (2013.01); *B23K 26/34* (2013.01); *B33Y 10/00* (2014.12); *B33Y 30/00* (2014.12)

(58) Field of Classification Search
CPC .. B23K 26/064; B23K 26/0608; B23K 26/34; B33Y 10/00; B33Y 30/00

USPC .................................................... 219/121.64
See application file for complete search history.

(56) References Cited

U.S. PATENT DOCUMENTS

| | | |
|---|---|---|
| 5,144,497 A | 9/1992 | Kato et al. |
| 6,143,378 A | 11/2000 | Harwell et al. |
| 6,664,507 B2 | 12/2003 | Akaba et al. |
| 6,818,854 B2 | 11/2004 | Friedman et al. |
| 6,934,014 B1 | 8/2005 | Kleinhuber |
| 9,050,674 B2 | 6/2015 | Sumner |
| 9,085,041 B2 | 7/2015 | Peters et al. |
| 9,095,928 B2 | 8/2015 | Ash et al. |

FOREIGN PATENT DOCUMENTS

WO    2016025701 A1    2/2016

OTHER PUBLICATIONS

International Search Report and Written Opinion, dated Mar. 19, 2018, in related PCT Application Serial No. PCT/US2018/012583, 11 pages.

(Continued)

*Primary Examiner* — Christine J Skubinna
(74) *Attorney, Agent, or Firm* — Grossman, Tucker, Perreault & Pfleger, PLLC

(57) ABSTRACT

Laser processing systems and methods image a multiple core array to a work surface in a multiple processing beam array. An optical system separates processing beams and converges the beams toward the work surface and focuses each beam of the array at or near the work surface. A central axis with access for filler material flow to the work surface is provided. The processing beam array and central filler material feed provide omni-directional additive laser processing capability.

20 Claims, 11 Drawing Sheets

(56) References Cited

OTHER PUBLICATIONS

Udo Fornahl, "High efficient fiber coupling of laser diode bars with >50% electro-optical efficiency out of the fiber core", Proc. SPIE 6876, High-Power Diode Laser Technology and Applications VI, 68760X, Feb. 25, 2008, 10 pages.

Leyens, et al., "Innovations in laser cladding and direct laser metal deposition", Laser Surface Engineering Processes and Applications, ISBN: 978--1-78242, Chapter 8, pp. 182-192.

ADDITIVE LASER MACHINING SYSTEMS AND METHODS

CROSS-REFERENCE TO RELATED APPLICATIONS

This application claims the benefit of U.S. Provisional Patent Application Ser. No. 62/442,692, filed on Jan. 5, 2017, which is fully incorporated herein by reference.

TECHNICAL FIELD

The present disclosure relates to additive laser machining and more particularly, to high power laser additive machining such as cladding and welding with centric axial feed consumable fill material and arrayed perimetral illumination in a direct processing head.

BACKGROUND INFORMATION

Laser-based additive manufacturing technologies are enjoying extreme interest with the advent of high power laser systems and very good beam quality parameters. Laser power from hundreds of watts to tens of thousands of watts has enabled additive metal processing, laser welding and laser material cutting. Two approaches used for processing are remote processing and direct processing. In remote processing a laser spot is scanned over the material to be processed, for example using beam deflecting mirrors. In direct processing, a processing head is mechanically positioned relative to a workpiece and the head delivers both a laser spot and a fill material.

While remote processing in additive processing applications is currently limited to dedicated systems and finite build volumes, direct processing heads can be readily applied to machine tools and in situ processing situations. Moreover, direct processing can add material to a preexisting base structure, for example laser based metal cladding can apply surface metal to an underlying metal structure. Material properties of the cladding can improve characteristics of the cladded part with regard to hardness, corrosion resistance and other desirable properties. Cladding can be used in repair operations to replace material wear and facilitate repair and re-machining of worn tooling as well as complex costly parts like turbine blades.

Several technologies used for metal cladding include sprayed molten metal, pneumatically delivered fused powdered metal and wire fed welded metal. While sprayed metal is generally applied as an area coating, fused powder and wire based technologies with precise laser application can be used to apply material to small areas with high precision. Repeated application of material can be used to build three dimensional structure layer by layer. Wire fed metal application may be preferred in some cases due to lower material cost, easier material handling, faster application and a fully dense welded morphology.

Traditional wire feed mechanisms for welding and cladding present consumable fill material off-axis from the laser. This can encumber the apparatus with directional considerations with regard to fill lead or lag depending on the particular application. That is to say, processing may be limited to relative tool travel in particular directions and extents due to the orientation of the processing head, wire feed, and melt pool geometry. Axially fed centric fill material feed systems may overcome these limitations to promote omnidirectional processing.

With an axial material feed mechanism, laser beam management is need to direct processing radiation to the work surface while avoiding the central volume obscured by the feed mechanics. A viable non-obscuring route is needed to bring material on the processing axis of the laser processing head. This means that a continuous annular illumination scheme is not possible without a break for feed material to be introduced from an off-axis system to the processing beam axis.

In one example in U.S. Pat. No. 6,664,507, a reflecting mirror system is used split the beam in two portions by redirecting a central portion of the beam to make way for a wire feed tube. More recently, a centric wire feed system inside a coaxial laser beam is described by Leyens and Beyer in "Innovations in cladding and direct laser metal deposition", chapter 8, pages 182-183 of Laser Surface Engineering Processes and Applications, ISBN: 978-1-78242-074-3. The COAXwire system from Fraunhofer IWS Dresden uses a three-way beam splitting arrangement to divide a collimated beam into three peripheral beams and focus the beams into a circular spot. The COAXwire system is rated to 4 kW. Various aspects of welding and cladding with multiple beam arrangements are described in U.S. Pat. Nos. 9,050,674; 9,085,041 and 9,095,928.

Improvements to the delivery of multiple independent beams for processing enhancement are disclosed in the PCT Publication No. WO/2016025701. Multiple fibers are fused to a bulk optic with a fiber core geometry arranged for multiple processing steps such as pre-heating, cleaning, ablating, cutting, brazing, welding, annealing and smoothing. The core pattern is imaged to the workpiece and power in different cores varies according to the processing step associated with the core. Conventional beam delivery optics do not allow modification of this fixed core pattern, so for different patterns a different fiber set and fused bulk optic would be required. Likewise, conventional focusing and alignment would adjust the entire core array image. A conventional collimator and focus lens system combination may not provide sufficient space between beams for centric components like fill material feed mechanics near the work surface.

Systems capable of powers in excess of 6 kW are desirable for improved processing speeds and capabilities. At such high powers, beam splitting techniques may limit power capability and power distribution, compromise beam quality, or require complex optical arrangements that are difficult to align and adapt to particular welding and cladding operations.

Thus, there exists a need for welding and cladding methods and systems with simple, high power, flexible beam delivery providing axial space near the work surface compatible with centric feed tool geometry.

SUMMARY

Accordingly, the present disclosure provides an efficient laser processing system with a multiple optical fiber core array. A beam from each core propagates into a laser processing head as a beam in a multiple beam array. An optical system receives the multi-beam array, spatially separates the multiple beams into multiple processing beams, arranges the multiple processing beams in a processing output array surrounding a central tool axis, and focuses each beam to one or more processing spots at or near a work surface.

In at least one embodiment of the present disclosure, each core of the core array is fused to a bulk optic, or an output block in an array of output blocks. In at least one embodiment of the present disclosure, a spatially separated multi-beam output is a radial array of beams. The optical system may be a Schwarzschild system, a catadioptric system, a beam redirecting system, an aspheric reflector, or a beam rotating optical system.

The present disclosure also provides an efficient laser processing method by propagating multiple laser beams in a multiple optical fiber core array to a laser processing head, outputting the multiple laser beams as a multiple beam output array, and providing an optical system that receives the multi-beam output array, spatially separates the multi-beam output into multiple processing beams, arranges the multiple processing beams in a processing output array surrounding a central tool axis, and focuses each beam to one or more processing spots at or near a work surface.

In at least one embodiment, the present disclosure provides access to a material feed mechanism along the central tool axis, feeding filler wire stock to the work surface along the central tool axis, irradiating one or more of the work surface and the wire with the processing spots, and melting the filler material at the work surface such that material from the wire is added to the workpiece. Processing beams maybe rotated or selected to provide processing material along multiple processing axes.

BRIEF DESCRIPTION OF THE DRAWINGS

These and other features and advantages will be better understood by reading the following detailed description, taken together with the drawings wherein.

DETAILED DESCRIPTION

Figure 1:
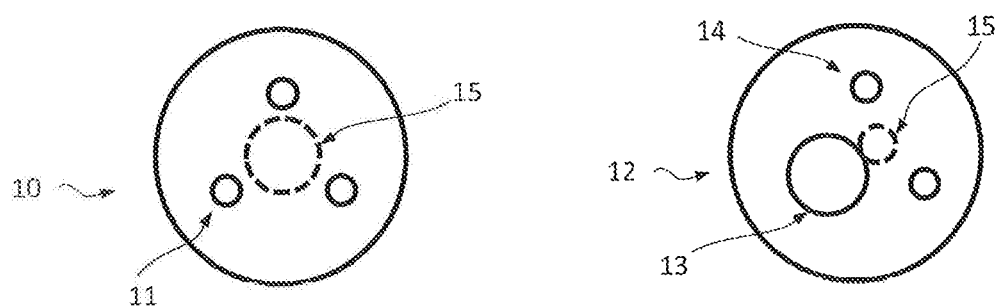
FIG. 1 provides an illustration of single block multiple core arrays.

Reference will now be made in detail to embodiments of the present disclosure. Wherever possible, same or similar reference numerals or letters are used in the drawings and the description to refer to the same or like parts or steps. The drawings are in simplified form and are not to precise scale. For purposes of convenience and clarity only, directional (up/down, etc.) or motional (forward/back, etc.) terms may be used with respect to the drawings. The term "couple" and similar terms do not necessarily denote direct and immediate connections, but also include connections through intermediate elements or devices.

Drawings may be simplified for clarity by schematically showing an array as 2 array elements in the plane of the page of propagating. For example, a radial array of any number of fiber cores, beams or optical elements may be simply depicted on the page as 2 fiber cores, beams, or optical elements. Drawings may also be simplified showing representative schematic chief rays depicting an optical path topology. Actual beam focusing characteristics may not be shown in schematic representations.

Fiber Core Array

The present disclosure provides a laser processing tool with imaging of a multiple fiber core array onto a work surface while providing space near the work surface for a filler material feed on the axis of the tool. As shown in FIG. 1, array 10 may be an annular array of similar sized cores 11. When strict symmetry is not required, as in array 12, cores 13, 14 may be different diameters. Each core may be between 50 microns and 600 microns and the number of cores and core sizes may be limited by the process fiber geometry and the physical extent of the downstream optics. In at least one embodiment, an annular array has a void area 15 that corresponds to an axial feed material path. As shown, this void may be centered in the case of a symmetric array, or may be off center in the case of an asymmetric array.

Output Optic

Each core in the array is fused to an output optic. In at least one embodiment, multiple cores are fused to a single quartz block comprising a bulk optic, for example, as described in WO/2016025701, which is fully incorporated herein by reference. The bulk optic may be from 2 mm to 25 mm in length and from 2 mm to 12 mm in diameter with multiple processing fibers fused to the block in a fixed arrangement. It is to be understood that in the present disclosure, the shape of the block may not be cylindrical and could be round, square, hexagonal or other shaped cross section. In all cases, the block has an exit face that is suited to withstand all high power processing beams to be transmitted through the block without damage.

Figure 2:
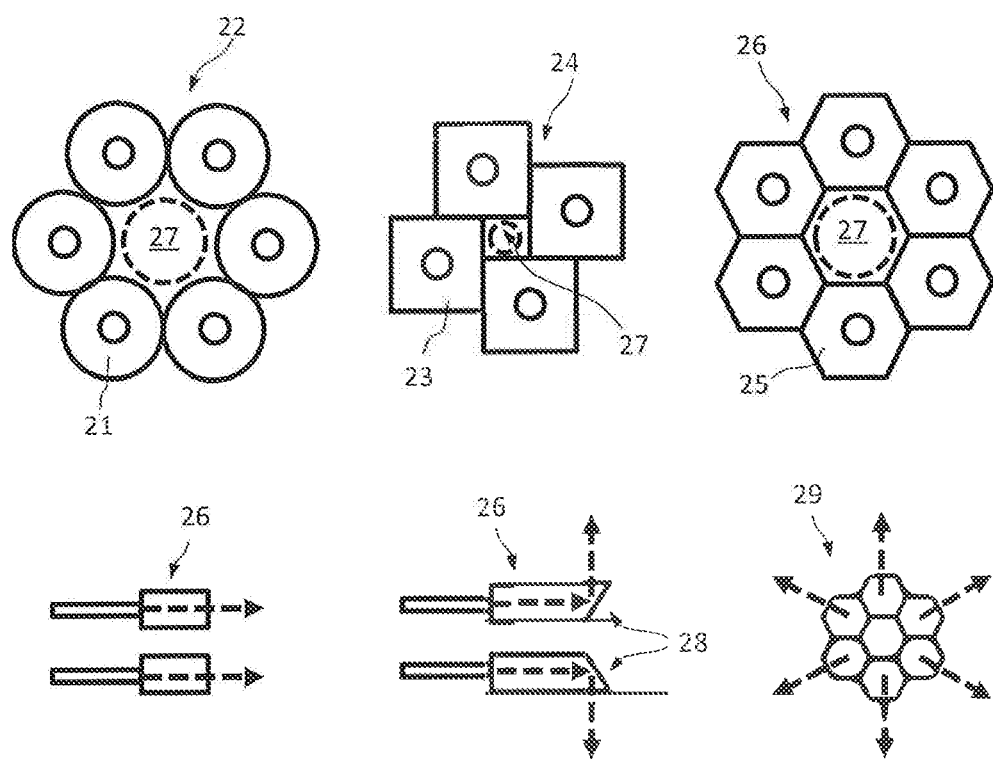
FIG. 2 provides an illustration of multiple block, multiple core arrays.

Referring now to FIG. 2, embodiments of the present disclosure may include fiber core arrays formed by an array of multiple output blocks. Multiple blocks 21 may be used with one or more processing fiber fused to each block in array 22. Each block may have a polygonal cross section such that the blocks can be arrayed. For example, four square cross section blocks 23 may form a 2×2 array 24 or six hexagonal blocks 25 may form a 6 element annular array 26. These and other geometric shapes may facilitate fusing multiple bocks into a bulk optic with increased spacing between fiber cores. When multiple blocks are used, fusing of cores to blocks may be simplified. Multiple blocks may be arranged with a central void 27 and provide coaxial access, for example for a feed material flow path, or control system connectivity.

In at least one embodiment, blocks include total internal reflection (TIR) faces 28. The TIR folds the beam to a sidewall exit face. In this way, the beam exiting the bulk optic forms part of a radial pattern. Conveniently and merely by way of example, an array of 6 hexagonal blocks with a TIR face provides planar side exit faces for radial pattern 29.

Figure 3:
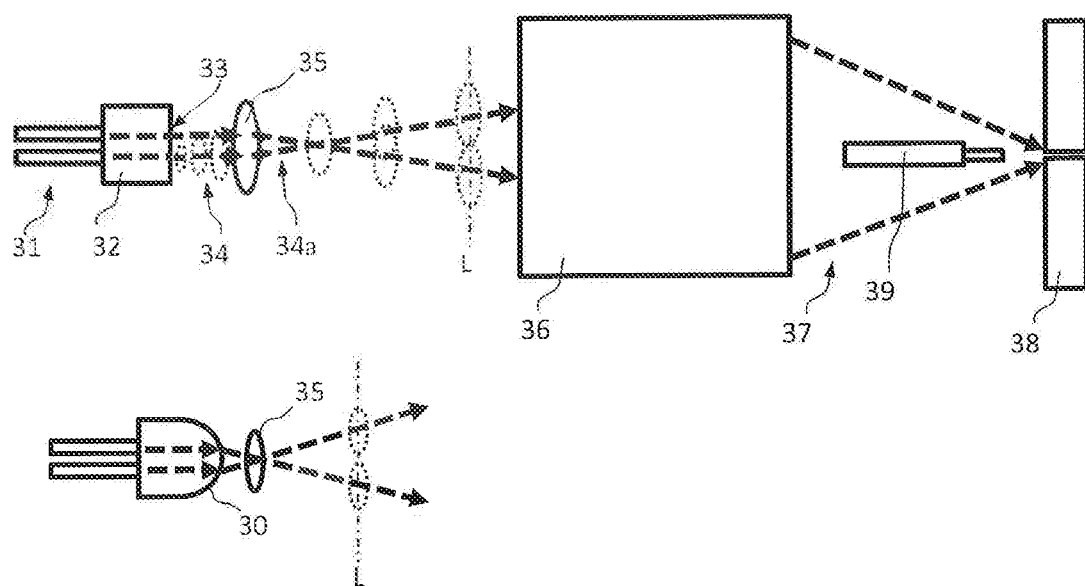
FIG. 3 provides an optical schematic of embodiments utilizing angular beam separation.

Now as shown in FIG. 3, in at least one embodiment, fiber core array 31 is fused to a bulk optic 32. Processing beams transmit through the bulk optic and exit the bulk optic at exit face 33. Preferably, the exit face of the bulk optic is antireflection coated to withstand multi-kilowatt output power. A respective beam 34 exiting the bulk optic diverges according to the numerical aperture of the respective core and the optical transfer from the bulk optic. For example, the numerical aperture exiting the bulk optic (or from multiple blocks) to air from a core may be between 0.1 and 0.22 NA, or between 0.14 and 0.16 NA. The numerical aperture may be different for each core.

Collimator

Figure 12:
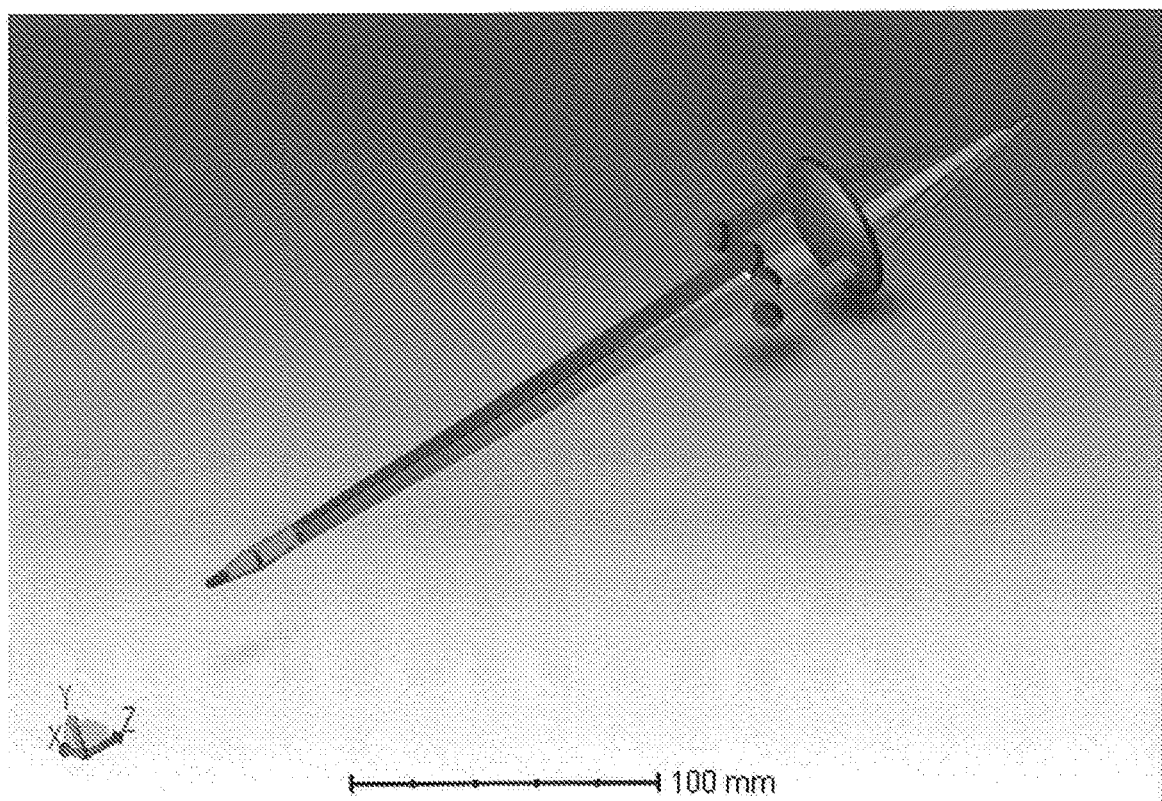
FIG. 12 provides an illustration of an embodiment using angular beam separation.

When multiple beams propagate away from a single face of a block, the beam profiles diverge according to the NA and as the beams sizes increase, overlap into a combined beam. With close proximity of cores, and beams in a single block, it may not be possible to directly separate beams with fold mirrors and the like. Moreover, if the beams are overlapping, it may not be possible to separate the beams with a beam splitter arrangement. Advantageously, a collimator may be used to provide beam separation. An embodiment using angular beam separation is also shown in FIG. 12.

A collimator optic 35 collimates all beams exiting the block together. As the collimated beams 34a propagate away from the collimator at different angles as a result of the different effective field positions of each beam due to core to core spacing, the beam profiles eventually separate at a distance L. Once the beams have separated, each beam is accessible for further modification by optical system 36, to converge processing beams 37 on work piece 38 with a space provided along the optical axis to accommodate feed mechanics 39.

Figure 11:
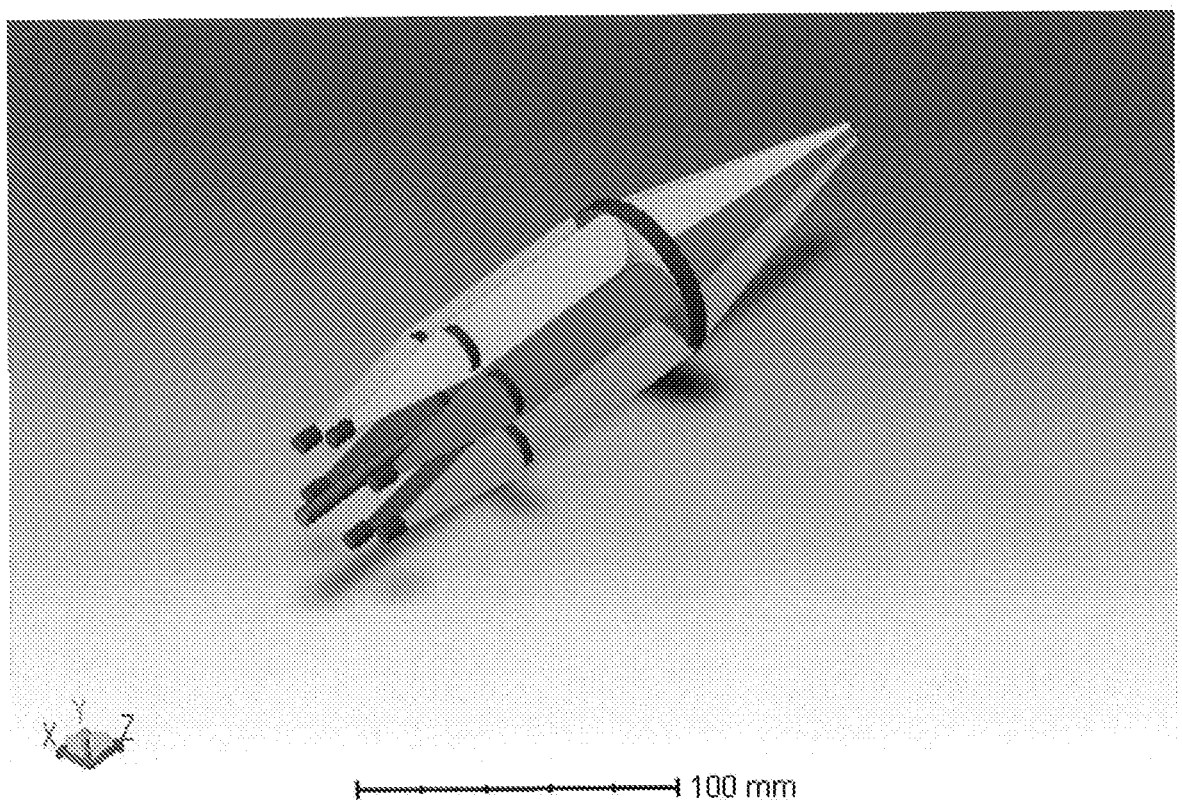
FIG. 11 provides an illustration of an embodiment using a collimator array.

In an alternative arrangement, each beam is collimated individually with a corresponding optic or a portion of at least one optical surface. A collimator array may be used to collimate each beam individually, for example, as shown in FIG. 11. This may be preferred when multiple blocks are used and core to core separation is large. Decentering of individual collimators relative to respective beams can provide angular beam displacement. In other embodiments, no collimator is used, in particular when a finite conjugate optical imaging system is used.

Field Lens

The exit face 33 of the bulk optic may be flat, however a radius may be preferred to prove a more compact optical system when the radius feature is not proscribed by attendant high power damage, for example from focused back reflections. The radius, preferably a convex radius 30 can function as a field lens. As shown, the field lens effectively increases the relative divergence between beams in the array and may be used to short the distance L. However, it is noted that shortening L also means that the diameters of each beam at the distance L are reduced. Power handling capacity of collimating elements and downstream optics may limit the practical application of the field lens effect with a bulk optic having optical power or in discrete field lens optics proximal to a bulk optic. The field lens may improve the system configuration with regard to downstream imaging optics, however the field lens should be considered optional, may be implemented as a lens element and in at least one embodiment the field lens is omitted. Imaging Separated beams may be considered collimated, however, one skilled in the art of optical system design will understand that variations with a departure from collimation are within the scope of the present disclosure. Likewise, beam axis propagation is not limited to be parallel to the optical axis of the system.

Now, since the object plane of the optical system is the fiber core array, the image plane will be an image of the cores. Preferably the magnification of the optical system is between 1× and 3×, but could be as high as 12× or 20× depending on core size and the desired image size. In some embodiments individual beams are redirected and recombined at the work piece. As a result, magnification of beam separation (array extents etc.) may not match core to core image magnification. Indeed, when array core images are redirected and superimposed, magnification of the array extent essentially goes to zero, but magnification of each core is finite. Generally, core images will be between 100 microns and 600 microns. Practitioners will appreciate that core magnification and fidelity of core imaging is highly application dependent. For example, certain processing applications may require a well-defined spot shape where others are more tolerant of imaging system aberrations and resultant spot shape defects.

In the case where the cores are single mode fiber cores, spot imaging properties may be calculated using Gaussian beam propagation. Optical modeling software can be used for Gaussian modelling as well as ray-based analysis to predict imaging performance and optimize particular imaging system embodiments for spot fidelity, efficiency, and other system parameters.

Figure 4A:
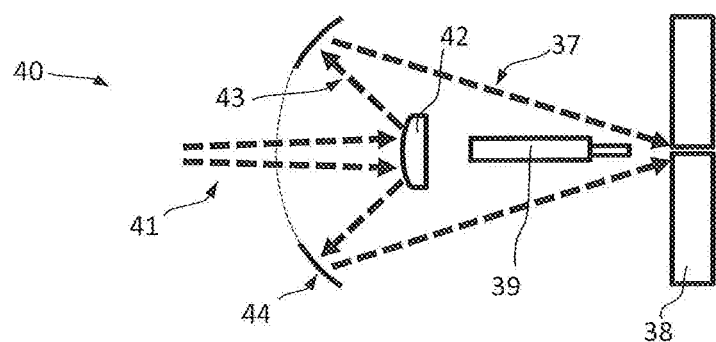
FIG. 4A provides an optical schematic of an embodiment using a Schwarzschild optical system.

Various optical configurations are contemplated to image separated beams. In one embodiment shown in FIG. 4A, a reflective Schwarzschild optical system is used. In the Schwarzschild system 40, beam array 41 is incident on a first mirror, convex mirror 42, after reflection the beams diverge from the first mirror as diverging beams 43. The diverging beams are incident on a second mirror, concave mirror 44. After reflection from concave mirror 44, converging beam array 37 propagates toward a common optical axis and a focus of each beam of the array at or near work piece 38. The first mirror becomes a central obscuration in the path following the second mirror, so preferably beams in array 37 pass by mirror 42 without beam clipping or vignetting. With the beam array suitably expanded, a central void of the expanded array corresponds to the central obscuration. Thus, after the beams pass the first mirror and the axis of the optical system can accommodate a feed tool such as a wire feed tube 39. Mirrors of this system may be spherical or may be aspherical to correct optical aberrations such as spherical aberration.

Figure 4B:
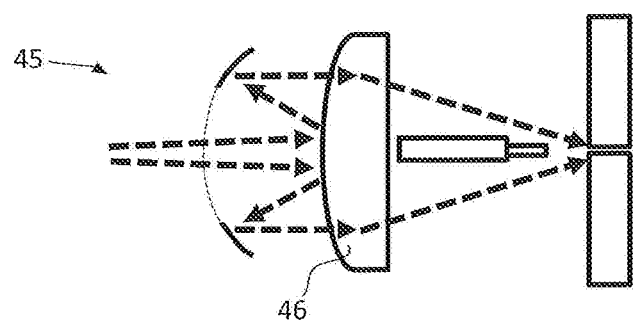
FIG. 4B provides an optical schematic of an embodiment using a catadioptric optical system.

In a different embodiment according to FIG. 4B, the imaging system may be a catadioptric system 45 with first and second mirrors followed by a refractive lens 46. When compared with the Schwarzschild arrangement, the size of the second mirror may be reduced. The refractive element may provide a sealed optical system. In one example of a catadioptric system, as shown, the first mirror is the first surface of the refractive element. In this embodiment, the second mirror may be an aspheric mirror. Many catadioptric variations are possible including a first mirror used as a discrete surface independent from any refractive element surfaces.

Adaptation of the optical system can modify the image of the core array. For example, it may be desirable to form a single spot by superimposing multiple beams rather than a full image of the core array. This can be accomplished by changing the distance from the tool head to the workpiece and allowing the respective beam array axes to converge at a distance from the nominal image plane. As a result of the change in axial distance, the beam array will be correspondingly defocused. To accommodate this focus change, a lens array with an element to focus each beam with a small optical power, for example an array of weak negative lenses can push out (or pull in) each core image focus to the distance where they are superimposed. It is noted that good centration of these lenses relative to each beam axis will prevent angular beam deviation. To some extent, focus accommodation may be provided with a collimating lens focus shift or a single entrance pupil element to change input beam collimation. However such collimation changes may affect downstream beam size and the lens array approach may provide more effective focus accommodation.

While an on-axis system may be as simple as 2 elements, the second mirror diameter is large and its optical surface area may be underutilized. Several different arrangements of direct beam steering mirrors may be used with discrete pairs of mirrors associated with each beam. A first mirror directs the beam away from the central axis and a second mirror condenses the beam axis to the desired location on the workpiece or on feed material.

Figure 5:
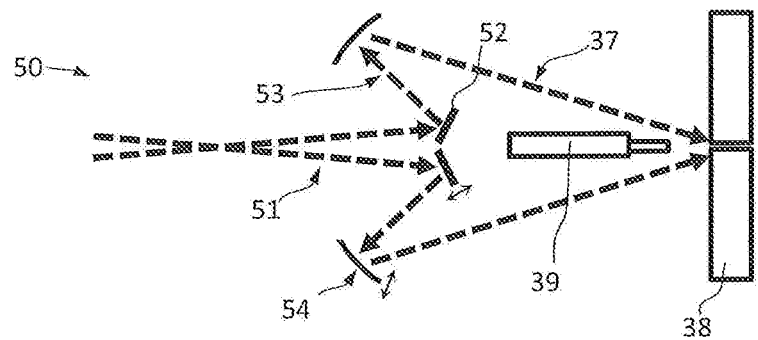
FIG. 5 provides an optical schematic of an embodiment using a beam redirecting optical system.

Referring to FIG. 5, in a beam redirecting embodiment 50, each beam 51 is reflected by a respective first mirror 52 to deflect the beams relative to the combined optical axis as beams 53 to impinge respective second mirrors 54. Second mirrors 54 deflect beams 53 and directly or in combination with downstream optical elements facilitate beams 37 that converge toward the combined optical axis. First mirrors 52 may deflect the beam radially away from the central axis as shown, towards and crossing the optical axis to the opposite side, tangential to the optical axis or at various intermediate angles. The particular arrangement may reduce the footprint volume of the optical system and/or provide space for access to the central axis or to increase space at the central axis. Various similar arrangements and variations of two mirror beam steering are possible and detailed three dimensional layout is considered routine.

Optical power can be included in one or more of second mirrors 54 with a concave surface figure as shown, and may be aspheric with an anamorphic shape such as a toroidal shape. Optical power may be added with one or more transmissive optical elements when second mirrors 54 are flat mirrors. The transmissive optical elements may form an array with one focusing element associated with each beam. In one embodiment, a single annular focusing element is used.

When beam deflection mirrors are used, beam positions can be controlled with tilt adjustment of the mirrors. Thus, mirror adjustment may be used for static alignment of core spot location. Moreover, mirrors may be dynamically controlled to impart beam motion at the workpiece, for example as a beam wobble for weld pool stirring and other applications.

Figure 6:
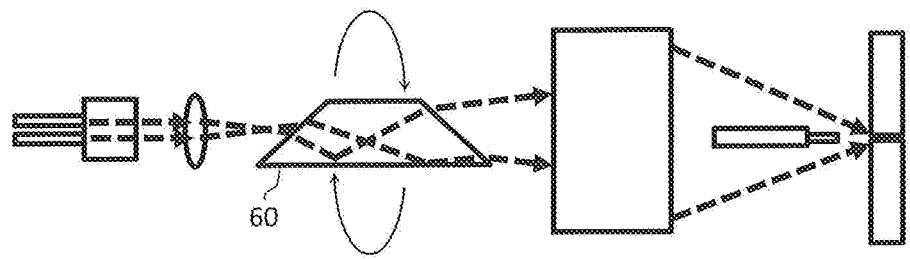
FIG. 6 provides an optical schematic of an embodiment using an image rotating optical system.
Figure 6:
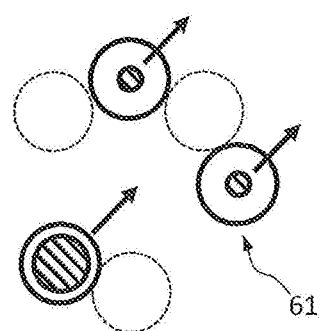
Figure 10:
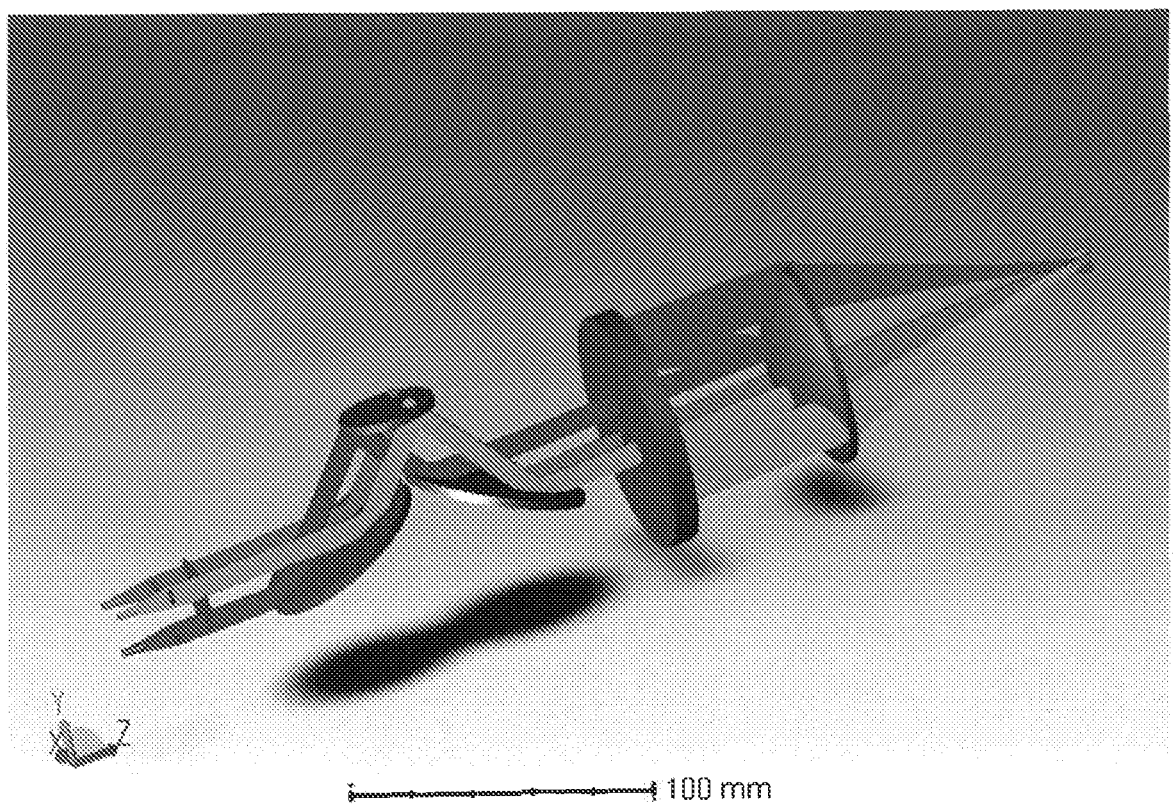
FIG. 10 provides an illustration of an embodiment using an image rotating optical system.

FIG. 6 shows a beam rotation system 60 that can be used as part of the optical system to provide reoriented fiber core images 61. For example, the beam rotation system can be a Dove prism or hollow Dove prism in the optical path following the collimator. With rotationally symmetric systems like the Schwarzschild system, continuous rotation to the extent that feed mechanics are not impinged is possible. For fixed discrete beam directing optics, the beam rotator may reorient the core images using fixed (clocking) rotation angles. With a three beam system, for example, a beam rotator may rotate the image of the array +−120 degrees so that different cores can be used for processing steps at the same orientation relative to the processing head. In a Cartesian system, reorientation of the processing image by 90 degrees can facilitate multidirectional tool travel along x and y axes. Another embodiment of an image rotating optical system is shown in FIG. 10.

Figure 7:
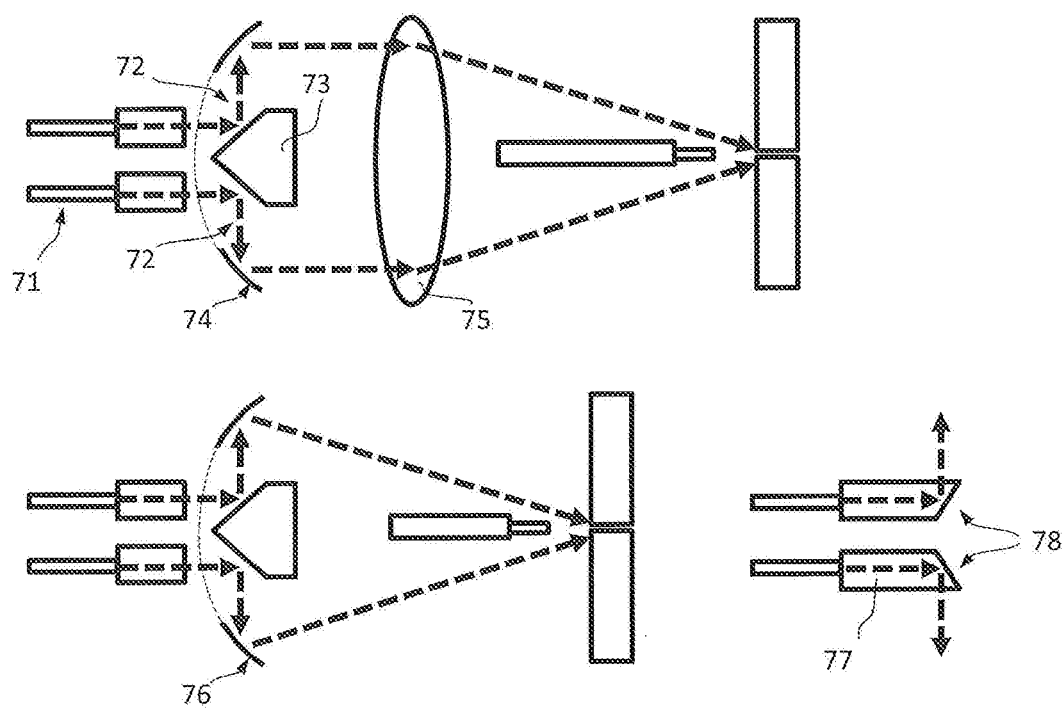
FIG. 7 provides an optical schematic of embodiments using a radial beam array.
Figure 13:
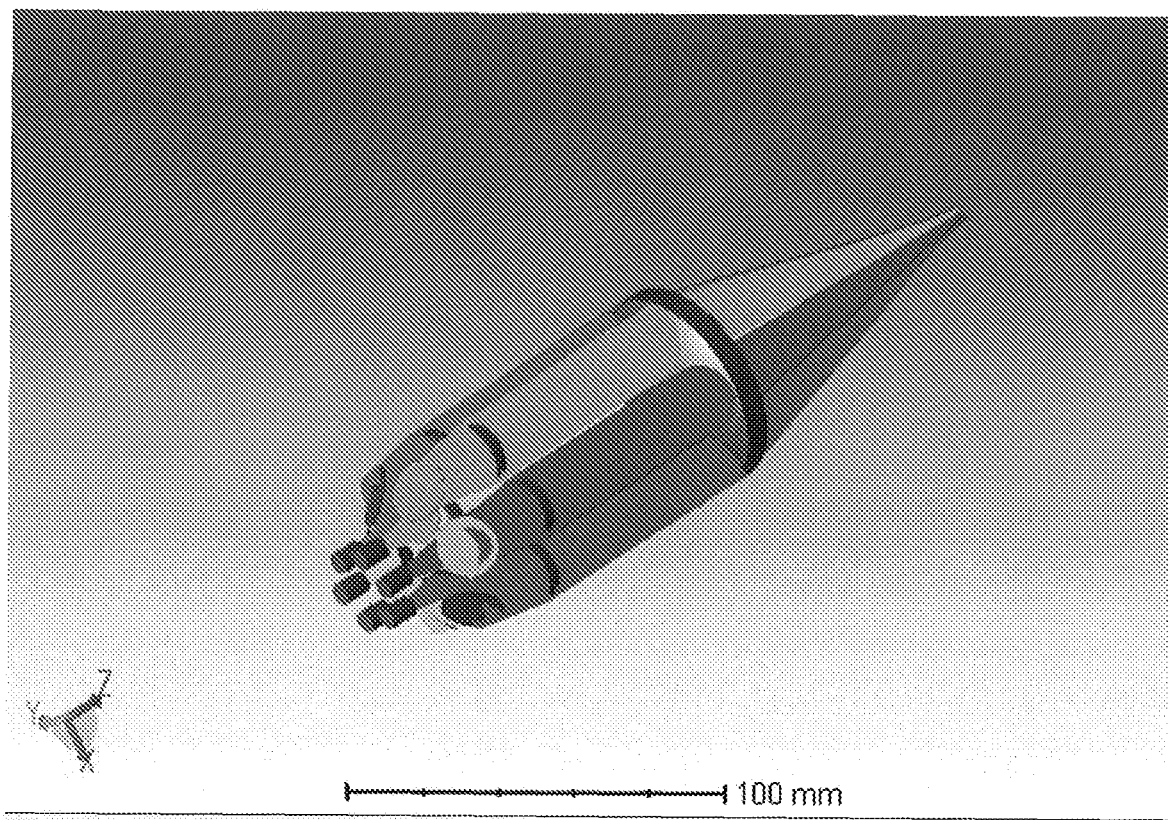
FIG. 13 provides an illustration of an embodiment using radial beam separation.

Referring to FIG. 7, in at least one embodiment beams from multiple fiber cores 71 are formed into a radial array of beams 72 with fan out optic 73. An aspheric mirror 74 can be used to collimate the radial beams. For example, for radial beams with a virtual core image at a common center of origin, a paraboloid mirror can collimate all beams and conveniently the collimated beams can propagate parallel to the optical axis. These beams can be converged and focused with a refractive optic 75. Another embodiment using radial beam separation is shown in FIG. 13.

Figure 14:
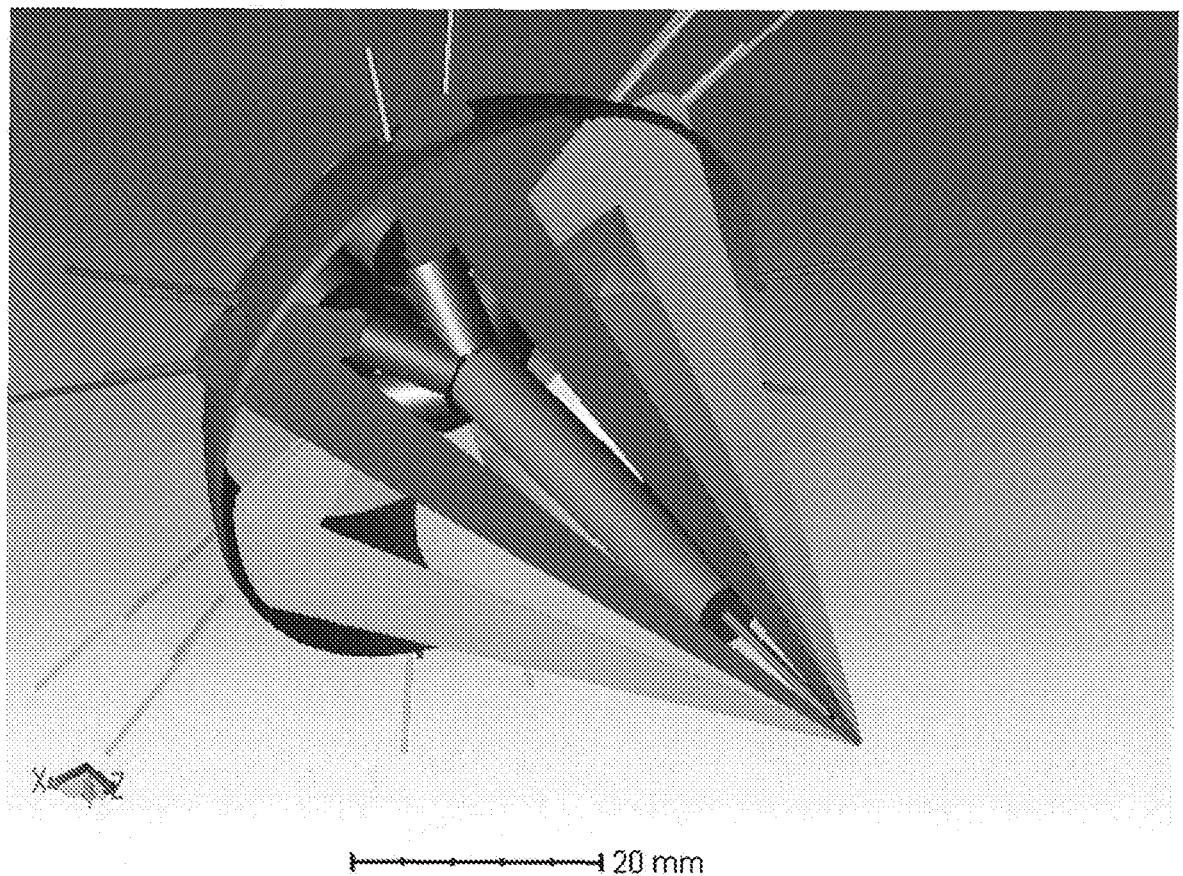
FIG. 14 provides an illustration of an embodiment using an elliptical focusing mirror.

With a radial array, an aspheric mirror 76 may comprise the entire imaging system. In this embodiment, the mirror is an ellipsoid. The virtual object cores are located at a first focus of the ellipsoid and the processing spot core image at the other focus. In this way, the single optic produces the working laser spot from a radial input array. An embodiment using an elliptical focusing mirror is also shown in FIG. 14.

The radial array may be formed with a cluster of side exit blocks, such as blocks 77 with a TIR face 78. The internal TIR deflection angle should accommodate the full NA of the beam. As such, the TIR surface incident angle may exceed 45 degrees for a quartz block with an index of refraction of approximately 1.45. An alternative arrangement to a TIR cluster is a reflective prism with one reflective face for each beam deflecting the beam into the radial array. For example, a ring of hexagonal rods may have a reflective angled face on each rod and may be clustered into a ring formation to generate a radial beam array.

It will be appreciated that the tool head may have rotational degrees of freedom, and that reorientation of beams in the head may be coordinated with controlled motion of the processing head. In particular, when feed mechanics occlude a processing beam, this may create an effective blind spot where the tooling head cannot orient a processing beam image. In this case, rotation of the head may be used to cover the blind spot angles. Different capabilities of tool head motion and beam rotation may improve overall processing capability such as when beam rotation provides increased speed relative to tool head rotation.

Additional core image modification may be provided with a zoom optical system. A zoom optical system can be used for variable control of core to process magnification. The processing head may have one or more zoom systems to adjust the spot size of one or more cores. When used in combination with preceding beam rotation, a single zoom system can modify each of multiple core images.

Two potentially limiting factors in the present disclosure are core size and core separation. First, sufficient core separation is needed to be able to access respective processing beams. Increased core clearance with larger intervening spaces can provide beam separation in compact optical systems. Second, large core diameter can reduce core clearance and diminish the space between cores.

Omnidirectional Processing

Figure 8:
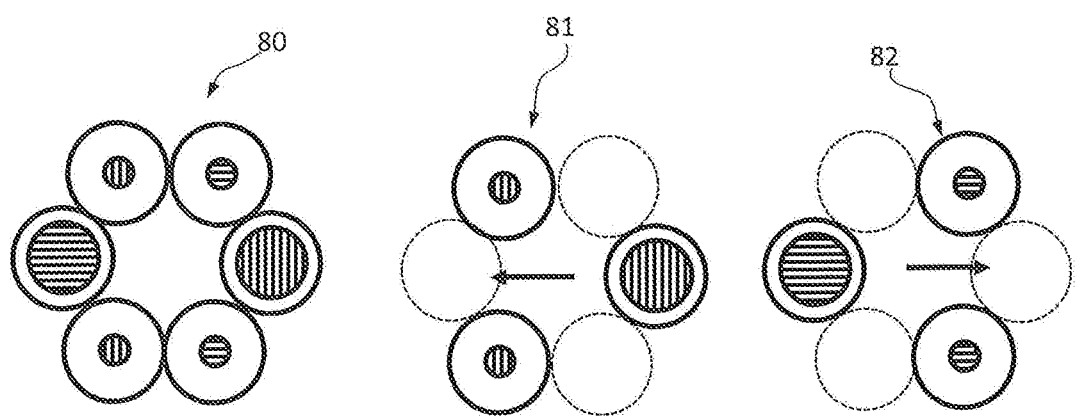
FIG. 8 provides an illustration of multidirectional processing along a single axis.

Aspects of the present disclosure are ideally suited to provide omnidirectional processing. The centric feed mechanics provide substantial freedom with regard to the direction of processing when beam imaging is controlled accordingly. In a bi-directional example illustrated in FIG. 8, an array 80 of six cores is imaged on to the work piece. The array may comprise 2 large diameter cores and 4 small diameter cores. The orientation of a sub array of three cores, two leading small cores and one lagging large core can be controlled by selecting either of 2 subsets 81 and 82.

Figure 9:
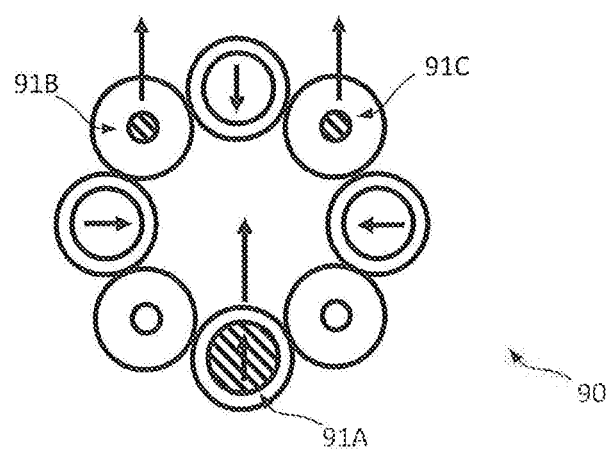
FIG. 9 provides an illustration of multidirectional processing along multiple axes.

Taking this core selection process further in FIG. 9, with an eight core array 90, Cartesian processing is possible by selecting a sub array of three cores 91A, 91B, and 91C. In this example, we note that the small diameter cores are each used in 2 orthogonal directions. Thus, four independent directions are provided with three beams in each direction with only eight cores, reducing the dedicated core count from 12 (3 cores times 4 orientations).

While aspects of the present disclosure are related to hot and cold wire fed welding filler materials, omni-directional processing is not limited to metal wire filler material. Filler material may be delivered on the tool axis with a paste dispenser, powder dispense, tape dispenser or other bulk material storage to work surface material delivery system. Likewise, welding and cladding are not limited to metal filling and metal base parts.

It will be appreciated that embodiments of the present disclosure may include additional provisions for introducing shielding gas, processing fluxes, and other consumable materials as part of the laser processing operation. These additional materials may be supplied from an off axis location, from a concentric location or in central axis of the processing head. The central axis may provide access for multiple consumable materials including multiple wire fed fillers.

Those skilled in the art will recognize or be able to ascertain using no more than routine experimentation many equivalents to the specific embodiments of the invention described herein. The disclosed schematics can be used with any laser system, but the impetus for the presently disclosed structure lies in material processing. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present disclosure.

What is claimed is:

1. A laser processing system comprising:
    a multiple optical fiber core array, each core configured to propagate a laser beam from a respective laser source into a laser processing head and to output the laser beam as a beam in a multiple beam output array; and
    a filler material feed mechanism for feeding a filler material to a workpiece for material processing, the filler material feed mechanism having a central tool axis;
    an optical system configured to receive the multi-beam output array, to spatially separate the multi-beam output into multiple processing beams, to arrange the multiple processing beams in a processing output array distributed around the central tool axis of the filler material feed mechanism, and to focus each beam to one or more processing spots at or near a work surface, wherein the optical system transmits each processing beam at greater than 50 percent efficiency from the fiber core array to the work surface.

2. The laser processing system as in claim 1 further comprising a bulk optic, wherein each core of the core array is fused to the bulk optic at the output ends of each core.

3. The laser processing system as in claim 1 further comprising at least one output block fused to one or more cores of the core array.

4. The laser processing system as in claim 1 further comprising an array of output blocks, wherein at least core of the core array is fused to each of the output blocks, wherein the output blocks are arrayed to form a central void providing coaxial access for the filler material feed mechanism.

5. The laser processing system as in claim 1 wherein the spatially separated multi-beam output is a radial array of beams.

6. The laser processing system as in claim 1 wherein the optical system comprises a Schwarzschild optical system.

7. The laser processing system as in claim 1 wherein the optical system comprises a catadioptric optical system.

8. The laser processing system as in claim 1 wherein the optical system comprises a beam redirecting optical system.

9. The laser processing system as in claim 1 wherein the optical system comprises an aspheric reflector.

10. The laser processing system as in claim 1 wherein the optical system comprises a beam rotating optical system.

11. A laser processing method comprising:
    propagating multiple laser beams in a multiple optical fiber core array to a laser processing head;
    outputting the multiple laser beams as a multiple beam output array;
    receiving the multi-beam output array in an optical system configured to spatially separate the multi-beam output into multiple processing beams, to arrange the multiple processing beams in a processing output array surrounding a central tool axis, and to focus each beam to one or more processing spots at or near a work surface; and
    directing filler material along the central axis to the processing spots at or near the work surface.

12. The laser processing method as in claim 11 further comprising:
    providing a material feed mechanism along the central tool axis.

13. The laser processing method as in claim 11 wherein directing filter material to the processing spots includes:
    feeding filler wire stock to the work surface along the central tool axis;
    irradiating one or more of the work surface and the wire stock with the processing spots, and
    melting the filler material at the work surface such that material from the wire stock is added to the workpiece.

14. The laser processing method as in claim 11 further comprising:
    providing access to the central tool axis for feeding the filler material to the central tool axis.

15. The laser processing method as in claim 11 further comprising:
    processing material along a first direction relative to the work surface; and
    processing material along a second direction relative the work surface.

16. The laser processing method as in claim 11 further comprising:
    rotating the multiple processing beams to align an array of processing spots relative the work surface.

17. The laser processing method as in claim 11 further comprising:
    selecting a subset of multiple processing beams to align an array of selected processing spots relative a processing direction at the work surface.

18. A multiple beam laser material processing method comprising:

setting at least one laser parameter in a first laser beam of a set of multiple laser beams;

propagating the set of multiple laser beams in a multiple optical fiber core array to a laser processing head;

outputting the multiple laser beams as a multiple beam output array;

receiving the multi-beam output array in an optical system configured to spatially separate the multi-beam output into multiple processing beams, to arrange the multiple processing beams in a processing output array surrounding a central tool axis, and to focus each beam to one or more processing spots at or near a work surface;

directing filler material along the central axis to the processing spots at or near the work surface; and processing the filler material at the work surface with the set of multiple laser beams.

19. The multiple beam laser material processing method as in claim 18 further comprising setting laser power in the first beam to be different than laser power in a second beam.

20. The laser processing method as in claim 18 further comprising:

providing a material feed mechanism along the central tool axis.

* * * * *